United States Patent
Hahn et al.

(10) Patent No.: US 9,088,737 B2
(45) Date of Patent: Jul. 21, 2015

(54) METHOD AND DEVICE FOR VISUALIZING THE SURROUNDINGS OF A VEHICLE BY FUSING AN INFRARED IMAGE AND A VISUAL IMAGE

(75) Inventors: Wolfgang Hahn, Schwabhausen (DE); Thomas Weidner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1946 days.

(21) Appl. No.: 11/890,495

(22) Filed: Aug. 7, 2007

(65) Prior Publication Data

US 2008/0024608 A1    Jan. 31, 2008

Related U.S. Application Data

(63) Continuation of application No. PCT/EP2006/000133, filed on Jan. 10, 2006.

(30) Foreign Application Priority Data

Feb. 11, 2005   (DE) .......................... 10 2005 006 290

(51) Int. Cl.
*H04N 5/33* (2006.01)
*B60R 1/00* (2006.01)

(52) U.S. Cl.
CPC .. *H04N 5/33* (2013.01); *B60R 1/00* (2013.01); *H04N 5/332* (2013.01); *B60R 2300/106* (2013.01); *B60R 2300/302* (2013.01);
(Continued)

(58) Field of Classification Search
CPC ............................ H04N 5/33; B60R 2300/302

USPC .......................................................... 348/148
See application file for complete search history.

(56) References Cited

U.S. PATENT DOCUMENTS

| | | | |
|---|---|---|---|
| 4,751,571 A | | 6/1988 | Lillquist |
| 5,001,558 A | * | 3/1991 | Burley et al. ................. 348/164 |
| 6,163,309 A | * | 12/2000 | Weinert ............................ 345/7 |

(Continued)

FOREIGN PATENT DOCUMENTS

| | | |
|---|---|---|
| DE | 102 07 039 A1 | 9/2003 |
| DE | 102 27 171 A1 | 1/2004 |

(Continued)

OTHER PUBLICATIONS

International Search Report dated Apr. 6, 2006 with English translation of relevant portion (Six (6) pages).

(Continued)

*Primary Examiner* — Tonia L. M. Dollinger
*Assistant Examiner* — Steven Nguyen
(74) *Attorney, Agent, or Firm* — Crowell & Moring LLP

(57) ABSTRACT

A method for visualizing surroundings of a vehicle, especially in the dark is provided. A visual image, containing the digital data of the surroundings shows the visually perceptible objects. An infrared image, containing the digital data of the surroundings, shows the infrared radiation, emitted by the visually perceptible and/or other objects. An image fusion takes place that fuses the visual image and the infrared image into a target image, which can be represented in an image display unit, in order to simplify the allocation of the infrared radiation-emitting objects in the recorded environment. The image fusion is interrupted as a function of one environment parameter in order to represent only one of the two images, or none of the images, as the target image.

19 Claims, 2 Drawing Sheets

(52) U.S. Cl.
CPC ..... *B60R2300/303* (2013.01); *B60R 2300/304* (2013.01); *B60R 2300/8053* (2013.01)

(56) References Cited

U.S. PATENT DOCUMENTS

| | | | |
|---|---|---|---|
| 7,199,366 B2 | 4/2007 | Hahn et al. | |
| 7,237,641 B2* | 7/2007 | Yanai | 180/271 |
| 2002/0034331 A1* | 3/2002 | Miura | 382/239 |
| 2003/0128436 A1* | 7/2003 | Ishii et al. | 359/630 |
| 2003/0218801 A1 | 11/2003 | Korniski et al. | |
| 2005/0190262 A1* | 9/2005 | Hamdan | 348/148 |
| 2006/0289772 A1* | 12/2006 | Johnson et al. | 250/370.08 |

FOREIGN PATENT DOCUMENTS

| | | |
|---|---|---|
| DE | 103 04 703 A1 | 8/2004 |
| EP | 0 691 559 A1 | 1/1996 |

OTHER PUBLICATIONS

German Search Report dated Oct. 24, 2005 with English translation of relevant portion (Eight (8) pages).

* cited by examiner

METHOD AND DEVICE FOR VISUALIZING THE SURROUNDINGS OF A VEHICLE BY FUSING AN INFRARED IMAGE AND A VISUAL IMAGE

CROSS-REFERENCE TO RELATED APPLICATIONS

This application is a continuation of PCT International Application No. PCT/EP2006/000133, filed on Jan. 10, 2006, which claims priority under 35 U.S.C. §119 to German Application No. 10 2005 006 290.3, filed Feb. 11, 2005, the entire disclosures of which are expressly incorporated by reference herein.

BACKGROUND AND SUMMARY OF THE INVENTION

The invention relates to a method and a device for visualizing the surroundings of a vehicle. The device fuses a visual image, which contains the digital data of the surroundings and shows the visually perceptible objects, and an infrared image, which contains digital data of the surroundings and which shows the infrared radiation, emitted by the visually perceptible and/or other objects, into a target image. The target image can be represented in an image display unit, in order to simplify the allocation of the infrared radiation-emitting objects in the recorded environment.

Devices for image fusion superpose the images of at least two cameras, which record the actual surroundings of a vehicle in a number of different spectral ranges. The spectral ranges may include, for example, visually perceptible light and infrared radiation. A target image, derived from image fusion, makes it possible for the driver of a vehicle to interpret more easily, and better, the information about the environment of the vehicle, wherein the information is made available in an image display unit.

For this reason, a camera system exhibits at least two cameras with largely parallel optical axes, which are offset spatially in relation to each other. Due to the offset mounting of the cameras (i.e., the offset optical axes), the images supplied by the cameras cannot be aligned in relation to each other over a wide range of distances in a manner that is totally faithful to the object. The object fidelity describes the radiation, which is reflected and/or emitted by one and the same object in the environment of a moving vehicle, in the target image can be clearly allocated to precisely this object by the driver.

Orientation errors and/or the quality of the object fidelity occur as a function of the distance of the cameras, and as a function of the distance between the cameras, and the recorded object. By calibrating the camera system it is possible to image quite well objects in either the close range (this corresponds to a driving situation that is typical for a vehicle traveling in the city and exhibits a distance ranging from approximately 15 to 75 m). However, in the far range, the consequence is poor image fidelity. The same applies if the camera system is optimized for objects in the far range (this corresponds, for example, to a cross country or freeway trip exhibiting a distance ranging from 30 to 150, or 50 to 250 m, respectively). Thus, the result is an orientation error in the close range.

Devices and methods for fusing images are known, for example, from German patent documents DE 102 27 171 A1 and DE 103 04 703 A1 (having U.S. counterpart U.S. Pat. No. 7,199,366 B2, the specification of which is expressly incorporated by reference herein) of the present assignee. The devices described therein includes a camera system that has a visual camera, which provides a visual image, containing the digital data of the environment, and an infrared camera, which provides an infrared image, containing the digital data of the environment. The visual image shows the visually perceptible objects. The infrared image shows the infrared radiation, emitted by the visibly perceptible and/or far objects. An image processing unit fuses the image of the visual image and the infrared image. The fused target image is displayed in an image display unit. The image fusing process includes a complete or partial superpositioning (for example, pixel-by-pixel or pixel region-by-pixel region) of the visual image and the infrared image. According to this method, in particular simultaneous and locally identical pairs of images are superposed. Therefore, brightness values and/or color values of the pixels or pixel regions can be superposed and/or averaged. For further optimization, the superpositioning of the images can be carried out by using weighting factors. Optionally, the consideration of the brightness and/or the visual conditions of the vehicle is described. Furthermore, the different weighting of the pixels or pixel regions is proposed. The drawback with these prior art methods is the large amount of computing that is involved in displaying target images, which are faithful to the object, over a wide distance range.

Therefore, there is needed an improved method and an improved device for visualizing the surroundings of a vehicle, which makes possible a reliable interpretation of the contents of a target image, generated from fused image.

The method according to the present invention for visualizing the surroundings of a vehicle, especially in the dark, provides a visual image, containing the digital data of the surroundings. This visual image shows the visually perceptible objects. Furthermore, the method provides an infrared image, which contains the digital data of the surroundings and which shows the infrared radiation, emitted by the visually perceptible and/or other objects. The images are fused: the visual image and the infrared image are fused to form a target image, which can be represented in an image display unit, in order to simplify the allocation of the infrared radiation-emitting objects in the recorded surroundings. The fusion of the visual image and/or the infrared image is interrupted as a function of one environment parameter in order to represent only one of the two images, or none of the images, as the target image.

In order to avoid an orientation error when representing a target image, the invention proposes that the image fusion is interrupted as a function of one environment parameter. Even though owing to the interruption of the image fusion in the event of an environment parameter, information is removed from the target image that is to be represented, it is easier for the user of a vehicle to interpret the target image represented in the image display unit. Therefore, the user is not diverted as much by the events taking place on the road in the vicinity of the vehicle.

According to one embodiment, all digital data of the surroundings of the respective image are blanked out in a step wherein the fusing of the visual image and/or the infrared image is interrupted in order to avoid blurring and/or double images. Expressed differently, this means that either the visual image or the infrared image, or even both images, are totally and not just partially blanked out. The latter means that no target image at all is represented in the image display unit.

The environment parameter is determined, according to another embodiment of the method according to the invention, from at least one driving dynamic variable, which is sensed by use of a sensor, and/or at least one other parameter.

In one embodiment, the speed of the vehicle, in particular the undershooting or overshooting of a predefined speed, is processed as the driving dynamic variable. In another embodiment, the distance between the vehicle and an object, recorded in the viewing angle of the camera, in particular the undershooting or overshooting of a predefined distance, is processed as the driving dynamic variable. Preferably, both parameters are considered in one combination.

Another embodiment provides that the current position of the vehicle is processed as the driving dynamic variable. In yet another embodiment, the topology and/or the current weather conditions are processed as the additional parameters. For example, when driving through a tunnel, the image fusion can be deactivated as a function of the topology and/or the momentary position of the vehicle, which can be derived, for example, from the GPS data that are made available to a navigation system. In such a driving situation, an infrared camera is hardly in a position to present in a meaningful way the information that is relevant to the user of the vehicle. Therefore, a superpositioning of the infrared image with the visual image would not result in the information, supplied to the user of the vehicle, being enhanced, so that it is advantageous, for example, to block off the infrared image from the target image. The same applies also in the event of poor weather conditions, such as rain, during which the infrared camera cannot provide an adequately good resolution of the environment.

Another embodiment provides that a parameter that can be chosen by the user of the vehicle is processed, as another parameter, by the image processing unit. In many situations it may be desirable for the user of the vehicle to change the representation of a target image, generated from an image fusion, and to represent selectively just the infrared image or the visual image. Therefore, the other parameter would correspond to a deactivation and/or activation of the image fusion that the user of the vehicle has actively initiated.

Furthermore, another embodiment can provide that the entropy values of the visual image and of the infrared image are determined; and the entropy values are compared with a predefined entropy value; and that, based on the results of the comparison, it is decided whether the visual image and/or the infrared image or both will be blanked out. The entropy of an image of the environment contains information about the significance of one of the images. If, for example, an image is in saturation (i.e., said image is overexcited), no information is delivered that the user of the vehicle can evaluate in any meaningful way. Upon detecting such a situation, the image that exhibits, for example, too low a contrast can be blanked out in order to interpret a situation.

The decision whether the image fusion of the visual image and/or the infrared image shall take place or be suppressed can be made as a function of the occurrence of one or more arbitrary aforementioned environment parameters. The decision to stop the image fusion can be made as a function, in particular, of the simultaneous occurrence of several parameters. It is also contemplated to interrupt the image fusion in the event of environment parameters that occur chronologically in succession.

In order to prevent the target image, represented in the image display unit, from alternating at short intervals between a fused and a non-fused representation (a feature that could perhaps confuse the user of the vehicle), another advantageous embodiment provides that the image fusion ceases in consideration of a time hysteresis.

The device according to the invention has the same advantages as described above in conjunction with the method according to the invention.

A device according to the invention for visualizing the surroundings of a vehicle, in particular in the dark, includes a camera system, which contains a visual camera, which provides a visual image, containing digital data of the surroundings, and an infrared camera, which provides an infrared image, containing the digital data of the surroundings. The visual image shows the visually perceptible objects; and the infrared image shows the infrared radiation, emitted by the visually perceptible and/or other objects. Furthermore, an image processing unit for processing the visual image and the infrared image is provided. The image processing unit is designed and/or equipped to fuse the visual image and the infrared image. An image display unit serves to display the image of the environment that is generated by the image processing unit. According to the invention, the image processing unit is designed to stop the image fusion as a function of an environment parameter.

One particular embodiment of the invention provides at least one sensor, coupled to the image processing unit, for determining a driving dynamic variable.

According to another embodiment, the image processing unit can be fed another parameter, which is determined either by use of a sensor or is supplied by an external means. The additional parameter could be transmitted to the image processing unit using, for example, mobile radio technology or via GPS.

Expediently, the image processing unit is designed to determine the environment parameter from the driving dynamic variable and/or an additional parameter.

In another embodiment, the camera system is calibrated with respect to a fixed distance range. The fixed distance range can be by choice close up or far away. Close range is defined here as a situation that corresponds to urban driving, where distances ranging from 15 to 75 m are significant. Far range is defined in this application as a driving situation that is typical for a vehicle traveling on rural roads, in particular in a distance range from approximately 30 to 150 m, or for a driving situation that is typical for a vehicle traveling on a freeway and that covers, in particular, a distance range from approximately 50 to 250 m. In principle, the camera system can be calibrated with respect to any distance. If the camera system is calibrated for the far range, the results are orientation errors in the close range owing to the offset optical axes of the cameras, a state that may cause irritations. A significant parameter that has an impact on the image fusion is the distance between the vehicle and a leading object, which is located in the close range of the vehicle, and/or the undershooting of a fixed speed. The camera system may be calibrated in an analogous manner for the close range so that imaging errors in the far range of the vehicle result in an analogous manner. Overshooting a fixed distance and/or a fixed speed could result in an interruption in the image fusion.

Other objects, advantages and novel features of the present invention will become apparent from the following detailed description of the invention when considered in conjunction with the accompanying drawings.

DETAILED DESCRIPTION OF THE DRAWINGS

Figure 1:
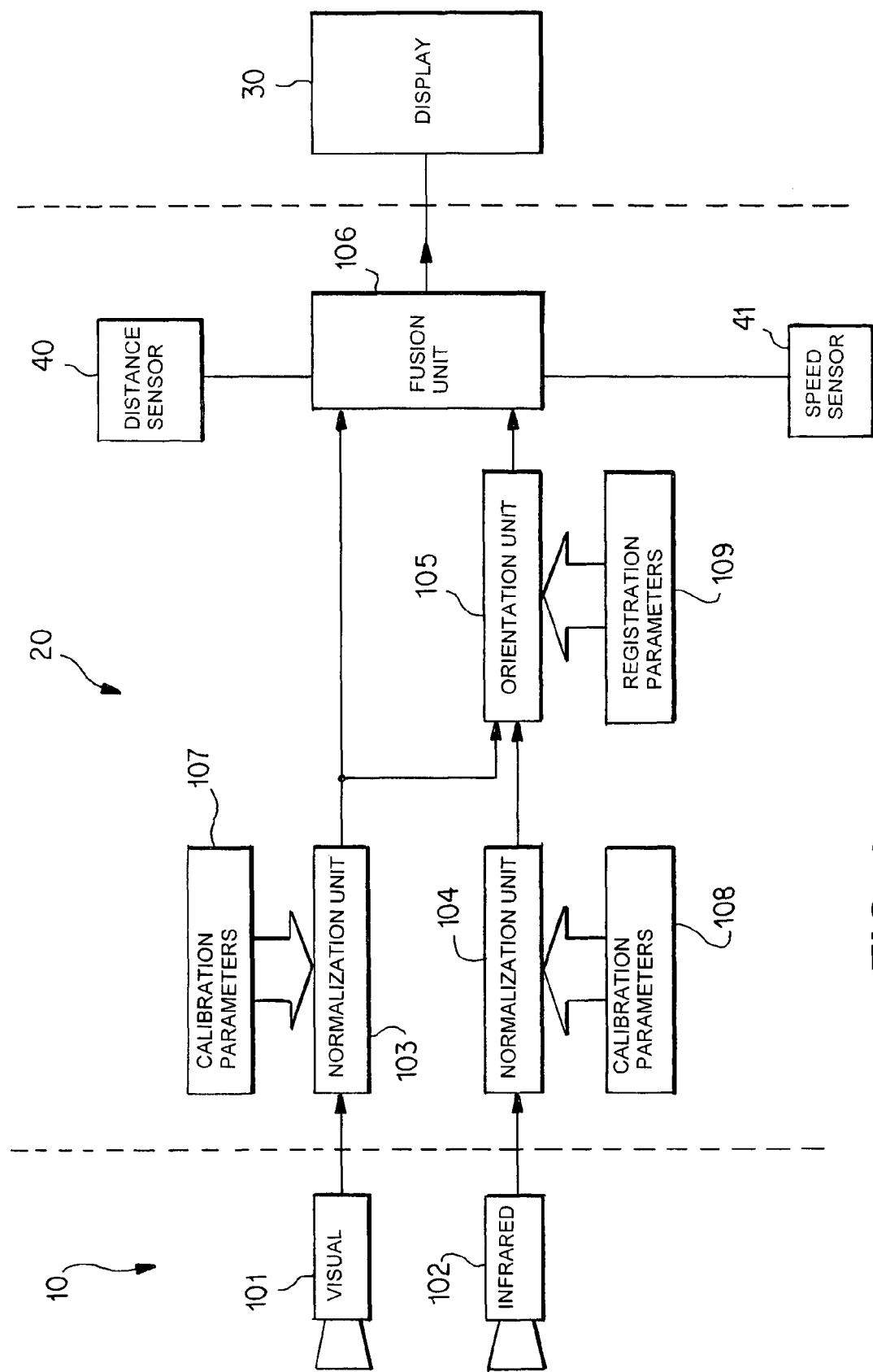
FIG. 1 is a block diagram of a device according to the invention for visualizing the surroundings of a vehicle.

The device according to the invention, depicted as a block diagram in FIG. 1, includes a camera system 10 having an electronic camera (for example, a CCD sensor), which is referred to here as the visual camera 101 and which records in the visual spectral range, as well as an electronic infrared camera 102 (for example, an infrared sensor), which is sensitive in an infrared spectral range from approximately 8 to 10 mm. The visual camera 101 delivers preferably a color, visual image. The optical axes of the cameras 101 and 102 are aligned preferably parallel to each other, thus being able to minimize the parallax error. The axes are located preferably close to each other, thus also minimizing offset errors. The image planes of both cameras or sensors are aligned preferably parallel to each other and perpendicularly to the optical axis and are located close to each other. The photo-sensitive sensor areas of both cameras and/or sensors are arranged preferably in such a manner that they are neither twisted nor tilted in relation to each other, but are arranged largely parallel to each other. In addition, both cameras or sensors have preferably the same opening angle. The result is that the cameras or the sensors deliver images of varying spectral ranges, which show largely the same section with respect to the environment and are not twisted in relation to each other and the actual situation. Thus, the effort associated with processing the images in order to provide a defined image from two images and, hence, the hardware and the software cost, can be significantly reduced.

An image processing unit 20, connected to the camera system 10, includes a first normalization unit 103, a second normalization unit 104, an orientation unit 105 and a superpositioning and/or fusion unit 106. The target image, generated by the fusion unit 106, can be represented in an image display unit 30.

The device, depicted in FIG. 1, is calibrated with respect to a fixed distance range by use of a calibration unit. A calibration unit (not illustrated in detail) is used for calibrating. The calibration unit exhibits, for example, a plurality of incandescent bulbs, which are arranged preferably in a chessboard pattern. The incandescent bulbs are distinguished by their ability to radiate both thermal radiation and visually perceptible radiation. Preferably a plate, provided with a plurality of incandescent bulbs or the like, is arranged in an interspacing area in front of both cameras 101, 102. The camera system 10 is then calibrated with respect to the interspacing area.

In the visual camera 101, the calibration unit, which is located in front of the cameras 101, 102 and which is arranged preferably in a dark environment and not in the vicinity of heat sources, generates a so-called visual image, which shows the incandescent bulbs, arranged in a chessboard pattern, in the same way as the human eye would see it. Furthermore, the calibration unit, in the infrared camera 102 generates a thermal image, which also shows the arrangement of the incandescent bulbs. Typically, both the visual image and the infrared image show distortions on the edges of the respective image, in particular owing to the optical imaging errors, etc. The distortions and/or imaging errors in the visual image are largely eliminated in a well-known way by the first normalization unit 103. The distortions and/or imaging errors in the infrared image are largely eliminated in a well-known way by the second normalization unit 104. The normalization and/or error correction is/are carried out preferably by measures, implemented in a well-known way, by use of software, on the digital data of the images, using the calibration parameters 107 for the visual image and the calibration parameters 108 for the infrared image.

The images, which have been normalized and/or largely freed of artifacts, are aligned in relation to each other by way of a registration process, which is well-known in digital image processing, with the alignment unit 105 using the registration parameters 109. In the alignment process, one of the images remains preferably unchanged and serves as the reference for the other image. The size and position of the second image are changed in such a manner that the result is an image, which in relation to the first image is largely identical to the object.

Therefore, the normalized images are aligned in such a manner in relation to each other that one and the same object appears in largely the same place and in largely the same size in the fused image. If this pre-processing step is not carried out, the results are ghosts, double images, shadow images, and/or twin images owing to the varying camera geometries and the camera offset. This means that an object appears in two locations and in a number of different sizes in the fused image. The viewer is rather irritated rather than helped by such an image.

The alignment of normalized images can be divided into three steps: displacement, rotation and scaling. The images that are aligned with respect to each other are superposed and/or fused by processing their digital data in the superpositioning and/or fusion unit 106. A fused or superposed image, which is presented to the driver of the vehicle in an image display unit 30 in the vehicle, is generated from each simultaneous and locally identical and/or object-identical pair of images comprising a visual image and an infrared image.

Preferably, the simultaneous and locally identical pairs of images comprising a visual image and an infrared image are fused on the basis of individual, mutually assigned pairs of pixels from both images, or by using a plurality of pixels from the two images. This process can be geared to the resolution that is desired and/or the computing power that is available for the digital image processing. The images that are preprocessed, as described above, are superposed and displayed by digital processing of their image data. In terms of the results, this process can be compared approximately with the process of stacking films or slides of the same scene or the driving environment. Through the use of computer technology and/or digital image processing this process is achieved by averaging the pixel data, especially in consideration of their brightness in the respective images and the color data, contained in the visual image and/or the infrared image. It does not have to be done necessarily pixel by pixel, but rather can also be carried out by averaging the simultaneous and locally identical pixel regions in both images.

Furthermore, it can also be expedient if in averaging, the pixel information in the infrared image is weighted differently than the simultaneous and locally identical pixel information in the visual image. This different weighting can be carried out, for example, as a function of the daylight and/or the weather and/or the headlight of a motor vehicle and/or as a function of the color in the visual image. Thus, the goal can be reached, for example, that a red traffic light in the fusion image can be especially easy to recognize.

Since the primary interest in the motor vehicle is to detect objects in the far range—that is, at distances ranging from 50 to 250 m—the results of the fixed setting of the calibration in the close range and the offset optical axes of the cameras 101, 102, are double images that can irritate the user of the vehicle. In order to avoid these irritations, the target image, represented in the image display unit 30, is limited to the reproduction of either the visual image or the infrared image as, for example, a function of the distance between the leading object and/or as a function of the speed of the vehicle.

Figure 2:
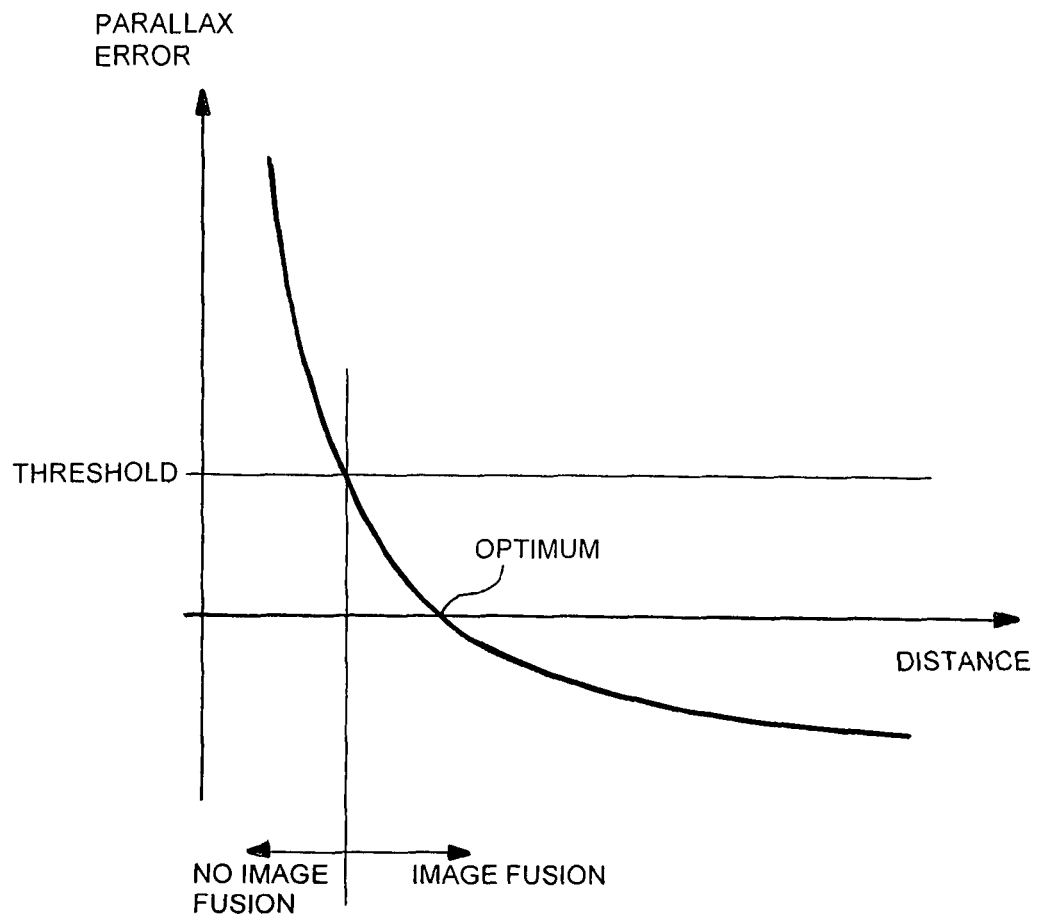
FIG. 2 shows the correlation between the parallax error and the distance in a camera system comprising two cameras, which have optical axes that are aligned in essence parallel to each other.

FIG. 2 shows the correlation between the parallax error and the distance between the camera system and the object recorded by the camera system. In this case, FIG. 2 shows a situation, where the device is optimized with respect to a parallax-free representation in the far range. If the parallax error exceeds a certain threshold, which can be a function of a plurality of different environment parameters, such as the speed and/or the distance and/or the weather conditions and/or the topology and/or the surroundings of the vehicle, then the image fusion is interrupted, and the image, which is more suitable for the situation, is represented in the visual camera or the infrared camera. In the embodiment example, this threshold is set at a distance that is less than the "optimal distance" set by calibrating. The threshold does not have to be necessarily permanently set, but rather can depend dynamically on a plurality of parameters or can be defined by a range.

The following scenarios may occur, for example.

At a traffic light the vehicle moves closer to a preceding vehicle, thus increasing the orientation error of the mutually fused images of the visual camera and the infrared camera in the target image. At which distance between the object and the camera system 10 a certain orientation error is exceeded is determined as a function of a distance, which is determined by a sensor 40 that is coupled to the image processing unit. After exceeding this orientation error, the image fusion is deactivated, and only the image of the infrared camera is displayed. As an alternative, it is also possible that in another embodiment only the image of the visual camera is displayed.

If, in another embodiment example, a predefined speed of the vehicle is not reached, the coverage of the vehicle's own headlights suffices to give to the user of the vehicle adequate information about the event in the nearer surroundings. Therefore, when a predefined speed of the vehicle is not reached, the image fusion is interrupted; and the image of the visual camera is not displayed in the target image; and only the image of the infrared camera is displayed. Thus, it is guaranteed that even in a poorly illuminated environment, such as in a housing development, a forest, a parking lot, etc., persons, animals, etc. are displayed. The speed is determined by way of a speed sensor 41, coupled to the image processing unit 20.

The two embodiment examples describe one application of the interruption of the image fusion at short distances and/or at low speeds of the vehicle. In general, the invention can also be applied when the device is calibrated in relation to a short distance. In this case, when a predefined distance and/or a fixed speed is exceeded, the image fusion would be interrupted.

The advantage of the method according to the invention lies in the fact that interrupting the image fusion in the target image eliminates the imaging errors that could lead to user irritation. The device according to the invention allows the use of an image fusion device, which is calibrated only with respect to a distance range. Therefore, there is no need for complicated control algorithms, which avoid imaging errors in all distance ranges and have to be derived by way of complicated computing algorithms.

TABLE OF REFERENCE NUMERALS

10 camera system
20 image processing unit
30 image display unit
40 sensor
41 sensor
101 camera
102 camera
103 normalization unit
104 normalization unit
105 orientation unit
106 fusion unit
107 calibration parameter
108 calibration parameter
109 registration parameter The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for visualizing surroundings of a vehicle, the method comprising the acts of:
    obtaining, by a visual camera, a visual image containing digital data of the surroundings, in order to show visually perceptible objects;
    obtaining, by an infrared camera, an infrared image containing digital data of the surroundings, in order to show infrared radiation emitted by the visually perceptible objects and/or other objects, wherein the visual camera and the infrared camera form a camera system;
    calibrating the camera system with respect to a fixed distance corresponding to one of a close range and a far range;
    fusing, by an image processing unit in the vehicle, the visual image and the infrared image into a target image, which target image is representable in a display unit, in order to simplify an allocation of the infrared radiation emitting objects in a recorded environment, and
    interrupting the fusing of the visual image and the infrared image automatically by the image processing unit in response to an orientation error exceeding a threshold, which is a function of an environment parameter, in order to represent only one of the visual and infrared images, or none of the images, as the target image, wherein the orientation error is a parallax error owing to the offset optical axes of cameras used to obtain the visual image and the infrared image, respectively, said orientation error occurring in the close range if the fixed distance to which the camera system is calibrated is the far range, and occurring in the far range if the fixed distance to which the camera is calibrated is the close range.

2. The method according to claim 1, wherein the interrupting act further comprises the act of blanking-out all of the digital data of the surroundings of the respective image in order to avoid image distortion.

3. The method according to claim 1, wherein the environment parameter is determined from at least one of a driving dynamic variable sensed via a sensor and at least one other parameter.

4. The method according to claim 3, wherein a vehicle speed related parameter is processed as the driving dynamic variable.

5. The method according to claim 4, wherein the vehicle speed related variable is one of an undershooting and overshooting of a predefined speed.

6. The method according to claim 3, wherein a distance related variable between the vehicle and an object is processed as the driving dynamic variable.

7. The method according to claim 6, wherein the distance related variable is one of an undershooting and overshooting of a predefined distance between the vehicle and the object.

8. The method according to claim 3, wherein a current position of the vehicle is processed as the other parameter.

9. The method according to claim 3, wherein at least one of a topology and a current weather condition is processed as the at least one other parameter.

10. The method according to claim 3, wherein a user selected parameter is processed as the other parameter.

11. The method according to claim 3, further comprising the acts of:
determining entropy values of the visual image and the infrared image;
comparing the entropy values with a predefined entropy value; and
determining whether the visual image, the infrared image, and/or both the visual and infrared images, is to be blanked-out based on results of the comparing act.

12. The method according to claim 1, wherein the interrupting act further comprises the act of ceasing the fusing act based upon a time hysteresis.

13. A system for visualizing surroundings of a vehicle, comprising:
a visual camera providing a visual image, containing digital data of the surroundings, the visual image showing visually perceptible objects;
an infrared camera providing an infrared image, containing digital data of the surroundings, the infrared image showing infrared radiation emitted by the visually perceptible objects and/or other objects, wherein the visual camera and the infrared camera form a camera system;
a calibration unit configured to calibrate the camera system with respect to a fixed distance corresponding to one of a close range and a far range;
an image processing unit for processing the visual image and the infrared image, the image processing unit fusing the visual image and the infrared image into a target image;
an image display unit which displays the target image from the image processing unit; and
wherein the image processing unit is operatively configured to automatically interrupt the fusing of the visual image and the infrared image when an orientation error exceeds a threshold which is a function of an environment parameter, wherein the orientation error is a parallax error owing to the offset optical axes of the visual camera and the infrared camera, respectively, said orientation error occurring in the close range if the fixed distance to which the camera system is calibrated is the far range, and occurring in the far range if the fixed distance to which the camera is calibrated is the close range.

14. The system according to claim 13, further comprising at least one sensor, coupled to the image processing unit, for supplying a driving dynamic variable utilized as the environment parameter.

15. The system according to claim 14, wherein an additional parameter is supplied to the image processing unit for utilization in interrupting the fusing of the visual image and the infrared image.

16. The system according to claim 13, wherein the image processing unit is operatively configured to determine the environment parameter based on a driving dynamic variable and/or an additional parameter.

17. A method of operating an image fusion system utilized for visualizing surroundings of a vehicle, the image fusion system operating to fuse a visual image obtained by a visual camera and containing digital data of the surroundings showing visually perceptible objects and an infrared image obtained by an infrared camera and containing digital data of the surroundings showing infrared radiation emitted by the visually perceptible objects and other objects, wherein the visual camera and the infrared camera form a camera system, the operating method comprising the acts of:
calibrating the camera system with respect to a fixed distance corresponding to one of a close range and a far range
receiving at least one environment parameter of the vehicle; and
interrupting the fusion of the visual image and the infrared image automatically when an orientation error exceeds a threshold which is a function of the at least one environment parameter, such that either only the visual image or the infrared image, or neither image, is displayed to a user of the vehicle, wherein the orientation error is a parallax error owing to the offset optical axes of cameras used to obtain the visual image and the infrared image, respectively, said orientation error occurring in the close range if the fixed distance to which the camera system is calibrated is the far range, and occurring in the far range if the fixed distance to which the camera is calibrated is the close range.

18. The operating method according to claim 17, wherein the interrupting is performed by blanking-out all of the digital data of the respective image or images.

19. The method according to claim 17, wherein the at least one environment parameter is one of a vehicle speed related variable and a vehicle distance related variable.

* * * * *